United States Patent
Harrington et al.

[19]

[11] 3,978,797

[45] Sept. 7, 1976

[54] RADIOMETRIC TARGET DETECTION DEVICE

[75] Inventors: William W. Harrington, China Lake; Frederick C. Alpers, Riverside, both of Calif.

[73] Assignee: The United States of America as represented by the Secretary of the Navy, Washington, D.C.

[22] Filed: Apr. 28, 1971

[21] Appl. No.: 142,837

[52] U.S. Cl. .................. 102/70.2 P; 102/70.2 R; 343/770; 343/774
[51] Int. Cl.² .................. F42C 13/06; F42C 11/00
[58] Field of Search .................. 343/770–774; 102/70.2

[56] References Cited
UNITED STATES PATENTS

| | | |
|---|---|---|
| 2,954,558 | 9/1960 | Honey et al. .................. 343/773 |
| 3,005,984 | 10/1961 | Winter et al. .................. 343/770 |
| 3,014,215 | 12/1961 | Macdonald .................. 102/70.2 P |
| 3,138,101 | 6/1964 | Lobelle .................. 102/70.2 P |
| 3,605,099 | 9/1971 | Griffith .................. 343/771 |
| 3,636,563 | 1/1972 | Laverick et al. .................. 343/771 |

Primary Examiner—Samuel W. Engle
Assistant Examiner—Thomas H. Webb
Attorney, Agent, or Firm—R. S. Sciascia; G. J. Rubens; J. W. McLaren

[57] ABSTRACT

A radiometer is mounted in a guided missile for detecting electro-magnetic thermal power in the microwave region of the spectrum radiated from an area of suspected targets with circuitry coupled thereto to respond to a predetermined change in level of radiation to generate a warhead fuzing signal.

1 Claim, 5 Drawing Figures

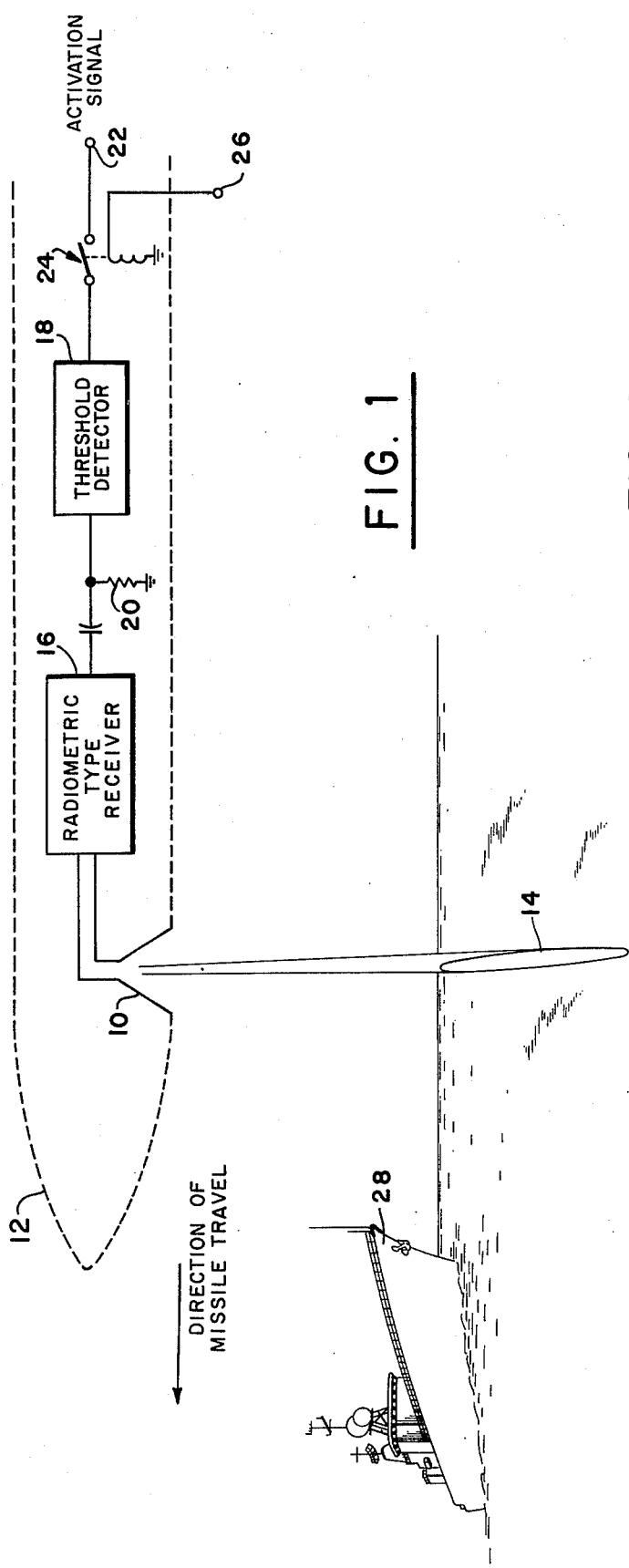
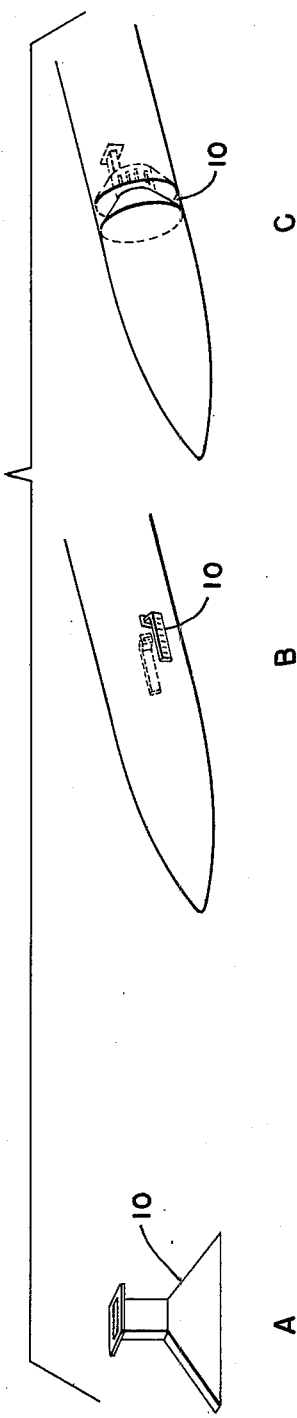
FIG. 1
FIG. 2
INVENTORS
WILLIAM W. HARRINGTON
BY FREDERICK C. ALPERS

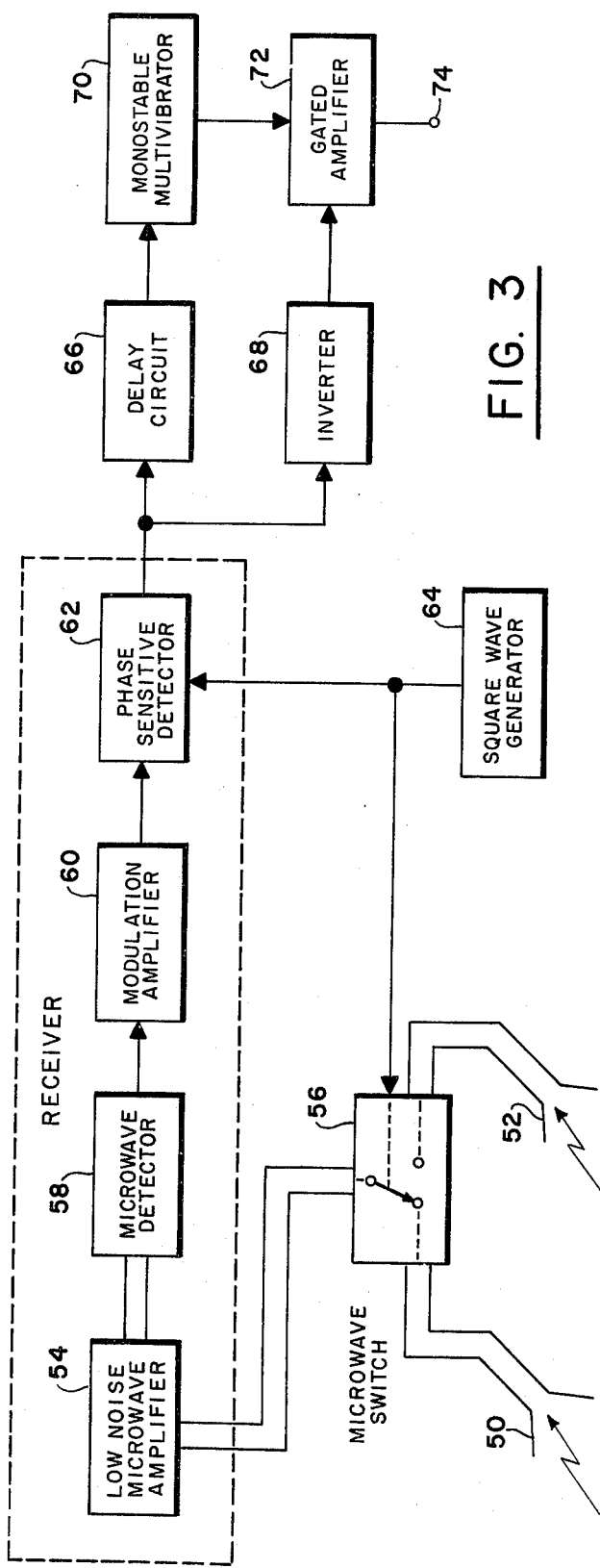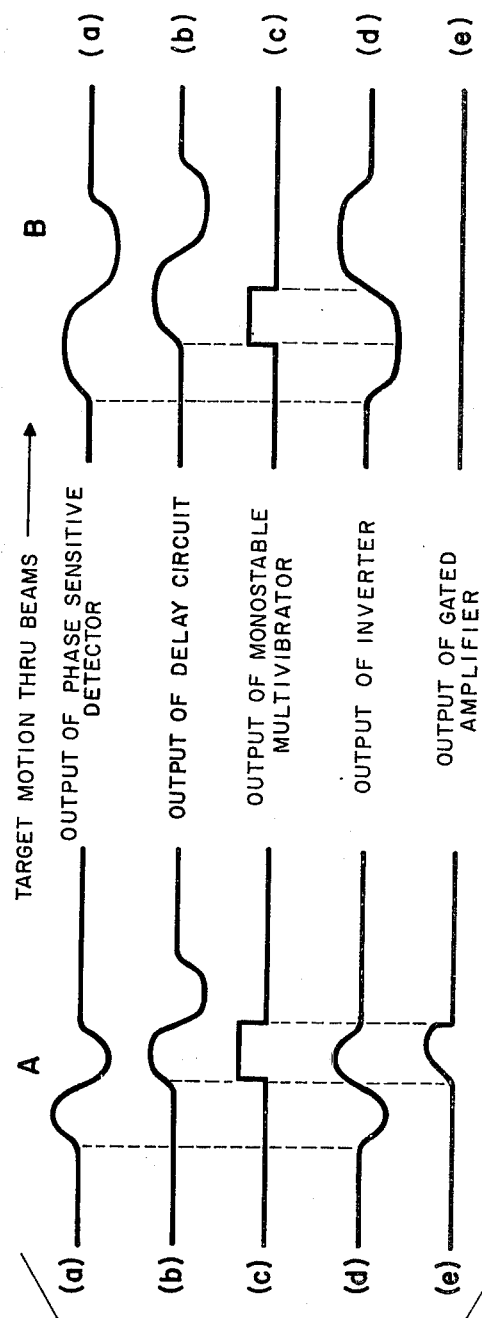
FIG. 3
FIG. 5

DIRECTION OF
BEAM MOTION

DIRECTION OF
BEAM MOTION

INVENTORS
WILLIAM W. HARRINGTON
BY FREDERICK C. ALPERS

RADIOMETRIC TARGET DETECTION DEVICE

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

The present invention relates to target detecting devices which will provide target detection for all weather missile fuzing against a ship or boat target irrespective of the presence of heavy sea clutter. The target detecting device can trigger detonation of the missile warhead if the missile happens to pass above or to either side of the target within given parameters. The invention may be used against air targets that are well separated from the ground and against metallic or similarly unnatural land targets that are reasonably isolated from like objects.

The present invention makes use of passive microwave radiometric emission to sense the presence of a target within the field of view of the target detecting device. It is well established from investigations of microwave radiometric technique for aircraft navigation or missile guidance purposes that the passive microwave signal reaching a radiometric sensor from the objects within its field of view will depend both on the black body radiation of the objects and the reflectivity of sky radiation. Radiometer functioning is dependent upon the apparent temperature of an object within its field of view. This apparent temperature is influenced by reflectivity as well as the Kelvin temperature. A target at thermal equilibrium with its background may be detectable. Since sky radiation of microwave frequencies arrives at nearly equal intensity from a great many directions, its reflection is not specular in nature and is not appreciably influenced by the angle of tilt of the reflecting surface. The signal received when a microwave radiometric device views the sea will not change appreciably with change in sea state, whereas the sea clutter signal received by an active radar may be 20 or 30db greater when the sea is rough than when it is calm.

Accordingly, an object of the invention is to provide an improved target detecting device that functions independently of sea state.

Other objects and many of the attendant advantages of this invention will be readily appreciated as the same becomes better understood by reference to the following detailed description when considered in connection with the accompanying drawings wherein:

FIG. 1 is a block diagram of a target detecting device embodying the invention using a single detecting antenna configuration;

FIG. 2 shows alternate forms of antennas to provide fan shaped beams;

FIG. 3 is a block diagram of a target detecting device embodying the invention using two detecting antennas;

FIG. 5 are waveforms used in explaining the operation of the embodiment of FIG. 3.

Figure 4:
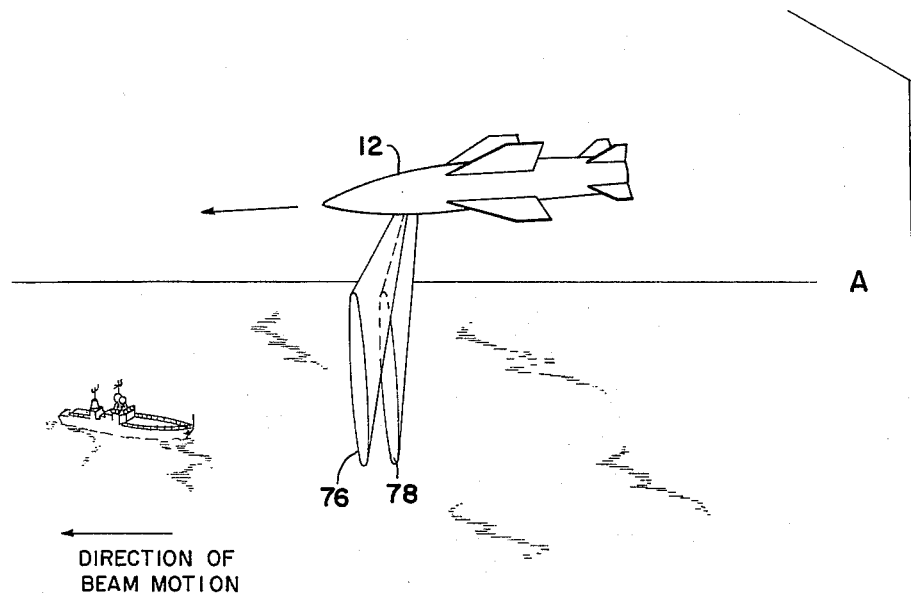
FIG. 4 illustrates alternate placement of antennas to provide different beam coverage.
Figure 4:
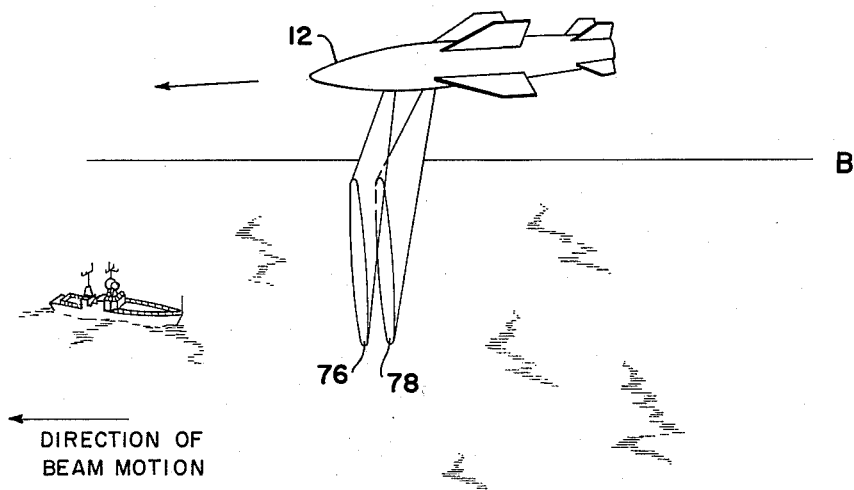

Referring to FIG. 1, there is shown a microwave radiomettric detecting system comprising an antenna 10 positioned in a missile 12 having a fan shaped beam 14 narrow in the direction of missile travel and wide in the orthogonal plane. Coupled to antenna 10 is a radiometric type receiver 16 which has a dc voltage output that is indicative of the total radiometric signal received from all objects within the fan beam 14. The output of receiver 16 is coupled to a threshold detector circuit 18 by means of a differentiation network 20. Any output signal from threshold detector circuit 18 is fed to output terminal 22 by means of switch 24 which is activated by an input signal from the missile guidance at terminal 26 only when the missile has begun terminal approach.

In operation, a combination of black body radiation and reflected sky radiation from the surface and objects on the surface that lie within the antenna beam 14 is received in receiver 16. Receiver 16 may be of the direct coupled type or of the Dicke type. When missile 12 begins its terminal approach to a target 28 and relay 24 is closed to connect the output of detector 18 to terminal 22, the output signal from receiver 16 represents radiometric signal from the sea alone. This output signal is substantially a steady signal regardless of waves or swell on the surface. When, due to forward motion of missile 12, beam 14 advances to where target 28 is included within its view, the output signal will change and result in an output from differentiation network 20. If the signal fed to detector 18 is of sufficient magnitude a firing pulse will be fed to terminal 22.

From the above it is apparent that the target detecting device will only be practical if the signal change when beam 14 moves from viewing the sea to viewing the ship has an absolute value above some critical amount. The critical change in the output of receiver 14 relates a critical change in the apparent temperature of the area viewed, which temperature change is known as the system temperature sensitivity ($\delta T$) and may be calculated from:

$$\delta T = (S/N) F T_0/(B\tau)^{1/2}$$

where the definitions of symbols and typical values (all readily attainable) for a 30 GHz radiometer are as follows:

B = receiver bandwidth = 1.0GHz
$\tau$ = detector time constant = 1.0msec
S/N = threshold signal-to-noise ratio = 6dB
F = receiver noise figure = 8dB
$T_0$ = temperature of background = 285°K These values yield $\delta T = 7.2°K$ as the minimum temperature difference detectable. As compared to this, the apparent radiometric temperature of metal is typically 60°K less than that of water while that of wood is approximately 120°K above that of water. Thus for the situation in which the target detecting device first views only the sea and then views only the target ship, which may be either wood or metal, the change in radiometric signal will be readily sensed with a considerable margin to spare. However, in a more typical situation the target detecting device may first view only water and then both the target and water together (as, for example, when the missile passes to one side of the target or when the target is too small to completely fill the beam). In this case a steel ship will become marginally detectable when it fills as much as 12% of the beam (7.2° ÷ 60°), and a wooden ship when it fills as much as 6% (7.2° ÷ 120°).

Several possible antenna configurations to provide a fan shaped beam of the type desired for target detecting device operation are shown in FIG. 2. If a single antenna such as shown in FIG. 2A does not provide the width of fan beam desired, several elements mounted as shown in FIG. 2B may be connected in parallel. If the target detecting device were to be adapted to air targets where a miss in any direction must be sensed, the biconical antenna shown in FIG. 2C may be utilized.

Referring to FIG. 3 there are shown two antennas 50 and 52 alternately coupled to the input of a low noise microwave amplifier 54 by means of microwave switch 56. The amplified signal out of amplifier 54 is detected in microwave detector 58 and its output signal is fed to modulation amplifier 60. When modulation of the signal is present the modulated signal will be amplified by amplifier 60 and fed to phase sensitive detector 62. Square wave generator 64 provides a control input to microwave switch 56 and a phase reference input to phase sensitive detector 62. The output signal from detector 62 is fed to delay circuit 66 and inverter 68. The delayed signal out of delay circuit 66 triggers monostable multivibrator 70 which generates a pulse that is fed to gated amplifier 72. Inverter 68 provides a second input to gated amplifier 72. The output signal of gated amplifier at terminal 74 is used to fuze a warhead (not shown).

In the operation of the embodiment of FIG. 3, two fan beams, 76 and 78, are used with one positioned just ahead of the other as shown in FIG. 4A. As shown in FIG. 3, the signal fed to amplifier 54 is switched at a high rate (e.g., 10 kHz) from one beam to the other by microswitch 56. Switch 56 is cycled at a high rate by means of a switching signal from square wave generator 64. If the radiometric signals received in the two antennas 50 and 52 (i.e., both are from the sea alone), the signal passing through the receiver will be essentially steady and unmodulated, and will be blocked rather than amplified by modulation amplifier 60. If a target is present in one beam and not the other, a modulation will be present and the modulation signal will be amplified. Phase sensitive detector 62, using the square wave signal from square wave generator 64 as the reference, detects the modulation. Phase detector 62 should be connected so that the presence of a metal target in the leading beam 76 results in an output having a positive polarity and the same target being present in the trailing beam 78 results in a negative polarity. The motion of beams 76 and 78 successively across a metal target will result in a fluctuation in the output of detector 62 which has the familiar discriminator type transfer function shown in waveform (a) of FIG. 5A. If use against wooden ships is desired either a switch can be provided to reverse phase connection in detector 60 or the circuitry following detector 60 can be duplicated, with one channel permanently phase connected for metal targets and the other channel connected for wooden targets.

As stated previously, the output of phase sensitive detector 62 is fed to both delay circuit 66 and inverter 68. Delay circuit 66 may be a filter type which produces a delayed fluctuation as shown in waveform (b) of FIG. 5A. The output of delay circuit 66 triggers monostable (one shot) multivibrator 70 that produces a gating pulse of a given duration (waveform (c), FIG. 5A). Meanwhile, the inverted form (waveform (d), FIG. 5A) of the signal out of detector 60 is supplied to gated amplifier 72. If the positive lobe of the inverted signal arrives in coincidence with the gate supplied by multivibrator 70, an output pulse (waveform (e), FIG. 5A) will appear at terminal 74 and serves to initiate the fuzing action. If the signal causing an output from detector 60 comes from a distant source (e.g., a source more than several hundred feet from the path of the missile), or if the signal comes from the target itself but the miss is too great for warhead effectiveness, the signal fluctuations that appear at the various points corresponding to the waveform of FIG. 5A are shown in FIG. 5B. The greater the distance to the source of radiating energy, the longer will be the time that that source will remain in each beam, and the result is that the positive lobe (waveform (d), FIG. 5B) does not arrive until after the gate (waveform (c)) has terminated. In this case no output appears at terminal 74.

Adjustments can be made in the delay of delay circuit 66 and the width of the gate produced by multivibrator 70 to vary the fuzing action with respect to target miss distance. If a particularly large ratio of miss distances is to be accommodated, antennas 50 and 52 can be separated along the missile longitudinal axis as shown in FIG. 4B.

Obviously many modifications and variations of the present invention are possible in the light of the above teachings. It is therefore to be understood that within the scope of the appended claims the invention may be practiced otherwise than as specifically described.

What is claimed is:

1. In a radiometric target detecting device for guided missiles the combination comprising:
   a. antenna receiving means including two antennas with one positioned just ahead of the other to form two fanshaped receiving patterns for receiving black body radiation and reflected sky radiation from an area of suspected targets,
   b. a radiometric type receiver,
   c. switch means alternately connecting said antennas to said receiver,
   d. said receiver including a modulation amplifier that amplifies and passes only modulated signals and a phase sensitive detector coupled to said modulation amplifier for detecting any signal modulation and generating an output signal in response to a target being present in one antenna pattern,
   e. a delay circuit coupled to the output of said phase sensitive detector,
   f. an inverter circuit coupled to the output of said phase sensitive detector for providing an inverted form of the output signal from said phase sensitive detector,
   c. g. a monostable multivibrator coupled to said delay circuit for producing a gating pulse of a predetermined time duration in response to the delayed output signal from said delay circuit,
   h. a gated amplifier having a first input coupled to the output of said inverter circuit and a second input coupled to the output of said monostable multivibrator and being responsive to generate a warhead actuating signal when the inverted signal arrives in time coincidence with said gating pulse.

* * * * *